US010501232B1

(12) United States Patent
Price

(10) Patent No.: US 10,501,232 B1
(45) Date of Patent: Dec. 10, 2019

(54) ADJUSTABLE WRAP-AROUND CONTAINER SYSTEM

(71) Applicant: Donald Todd Price, Dallas, TX (US)

(72) Inventor: Donald Todd Price, Dallas, TX (US)

(*) Notice: Subject to any disclaimer, the term of this patent is extended or adjusted under 35 U.S.C. 154(b) by 107 days.

(21) Appl. No.: 15/647,003

(22) Filed: Jul. 11, 2017

Related U.S. Application Data

(60) Provisional application No. 62/365,685, filed on Jul. 22, 2016.

(51) Int. Cl.
*A01G 9/02* (2018.01)
*B65D 21/08* (2006.01)
*B65D 85/00* (2006.01)

(52) U.S. Cl.
CPC ............ *B65D 21/083* (2013.01); *A01G 9/02* (2013.01); *B65D 85/70* (2013.01)

(58) Field of Classification Search
CPC .... B65D 21/083; B65D 21/0204; A01G 9/02; A01G 9/027
USPC ................................................ 220/23.4, 23.2
See application file for complete search history.

(56) References Cited

U.S. PATENT DOCUMENTS

| 876,235 | A | * | 1/1908 | Quackenboss | A01G 9/02 206/557 |
|---|---|---|---|---|---|
| 1,513,673 | A | * | 10/1924 | Pearson | E04D 13/064 405/120 |
| 3,302,949 | A | * | 2/1967 | Wolfe | A63H 23/16 104/73 |
| 3,696,960 | A | * | 10/1972 | Smirle | B65D 21/08 220/23.4 |
| 4,564,118 | A | * | 1/1986 | Heyer | F25D 25/021 220/8 |
| 5,852,895 | A | * | 12/1998 | Sinanan | A01G 9/022 47/33 |
| 6,450,349 | B2 | * | 9/2002 | Lee | B65G 11/143 211/175 |
| 7,645,001 | B2 | * | 1/2010 | Harris | A47B 96/025 312/205 |
| 8,904,706 | B1 | * | 12/2014 | Smith | A01G 9/027 47/65.6 |
| 9,149,006 | B1 | * | 10/2015 | Pope | A01G 9/027 |
| 9,938,066 | B2 | * | 4/2018 | Ranade | B65D 11/10 |
| 2005/0246956 | A1 | * | 11/2005 | Gonzalez Miguez | A01G 9/027 47/66.1 |
| 2008/0086942 | A1 | * | 4/2008 | Maier | A01G 9/027 47/65.5 |
| 2017/0258016 | A1 | * | 9/2017 | Goshen | A01G 9/027 |

* cited by examiner

*Primary Examiner* — Mollie Impink
(74) *Attorney, Agent, or Firm* — Shifrin Patent Law; Dan Shifrin

(57) ABSTRACT

An adjustable wrap-around container system is provided comprising a plurality of connectable modules. Each module includes an outer perimeter wall and an inner perimeter wall defining an outer volume therebetween, the inner perimeter wall surrounding an inner volume that may contain, for example, a post. The inner and outer perimeter walls may both include two segments, joined at an angle, such as 90°, at their inner edges. A module connects to an adjacent module by sliding a tab on the module into a slot in the adjacent module. By adjusting how far each module slides into the adjacent module, the dimensions of the inner volume may be varied. The assembled container can retain solids, such as soil for plants, liquids, or other materials.

11 Claims, 10 Drawing Sheets

ADJUSTABLE WRAP-AROUND CONTAINER SYSTEM

RELATED APPLICATION DATA

The present application is related to commonly-owned and U.S. Application Ser. No. 62/365,685 entitled ADJUSTABLE WRAP AROUND CONTAINER, filed on Jul. 22, 2016, which application is incorporated herein by reference in its entirety.

TECHNICAL FIELD

The present invention relates generally to containers and, in particular, containers with adjustable dimensions.

BACKGROUND ART

A typical container is rectangular or circular in shape and has fixed dimensions. As just one example, flower boxes are frequently placed on a porch or patio to display flowers or other small plants and are available in many different sizes. However, in order for flowers to be placed around the perimeter of a post 1, four such boxes 10 would have to be used (FIG. 1). Alternatively, a homeowner may construct a custom box 20 around a post 1 (FIG. 2).

SUMMARY OF THE INVENTION

Embodiments of the present invention provide an adjustable wrap-around container system comprising a plurality of connectable modules. Each module includes an outer perimeter wall and an inner perimeter wall defining an outer volume therebetween, the inner perimeter wall surrounding an inner volume that may contain, for example, a post. The inner and outer perimeter walls may both include two segments, joined at an angle at their inner edges. A module connects to an adjacent module by sliding a tab on the module into a slot in the adjacent module. By adjusting how far each module slides into the adjacent module, the dimensions of the inner volume may be varied. The assembled container can retain solids, such as soil for plants, liquids, or other materials.

In some embodiments, the number of modules in the system is four and the angle between the segments of the inner and outer walls is such as 90°. Thus the modules are able to surround a rectangular object. In other embodiments, the system may include a different number of modules and with a different angle between segments, thus being able to surround objects of other shapes.

In other embodiments, the system may include a module that is closed at one end and another module that is closed at the other end. When connected to each other, and with a module that is open at both ends, the assembled container is able to partially surround an object while still being able to retain material within.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

In addition, embodiments of the present invention may have many applications. However, it will be appreciated that the embodiment described and illustrated herein, a flower box to surround a post, is merely representative and not meant to be limited to that application.

Figure 1:
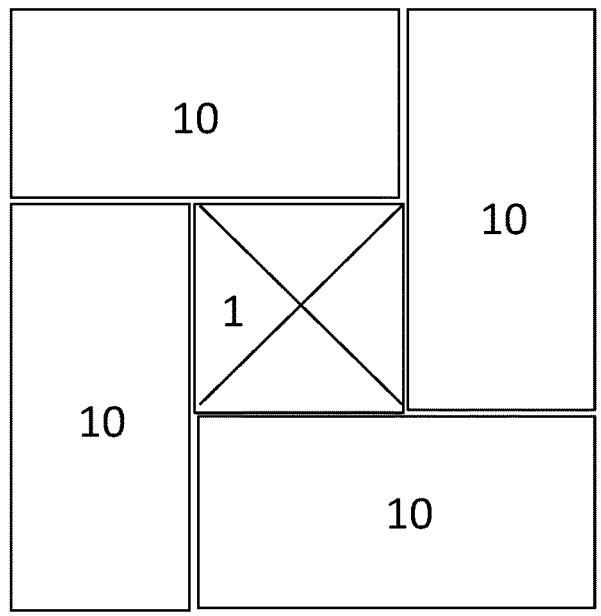
FIG. 1 illustrates four prior art boxes arranged around a post.
Figure 2:
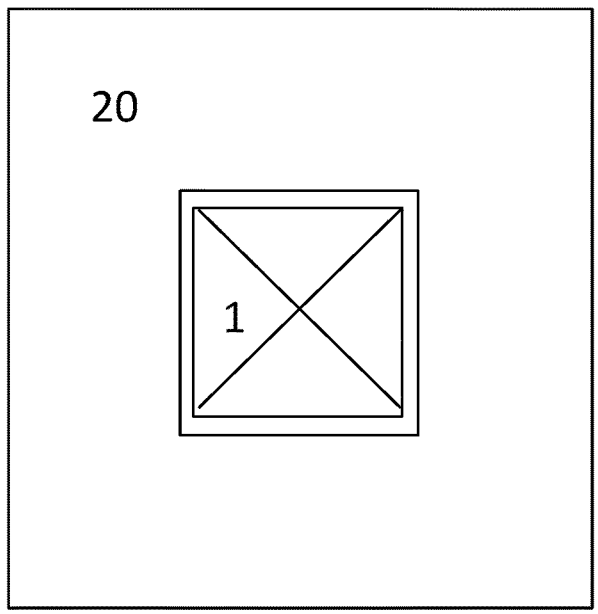
FIG. 2 illustrates a prior art custom box constructed around a post.
Figure 3:
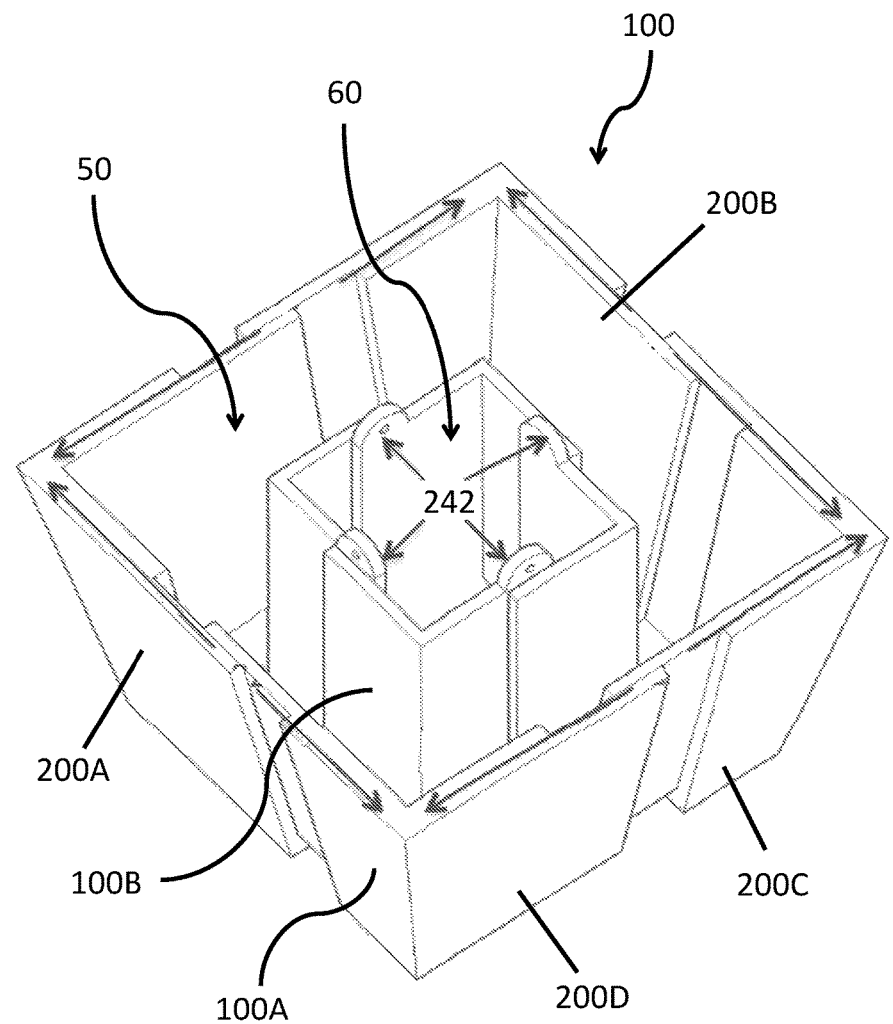
FIG. 3 is a top perspective view of an embodiment of an adjustable wrap-around container of the present invention.

FIG. 3 illustrates an embodiment of an assembled adjustable wrap-around container 100. The container 100 comprises four modules 200A, 200B, 200C, 200D (generically referred to as 200). When assembled as illustrated, the modules 200 form an outer perimeter wall 100A and an inner perimeter wall 100B which define an interior volume 50 therebetween. The inner perimeter wall 100B surrounds a space 60, which may be occupied by, for example, a post.

Figure 4:
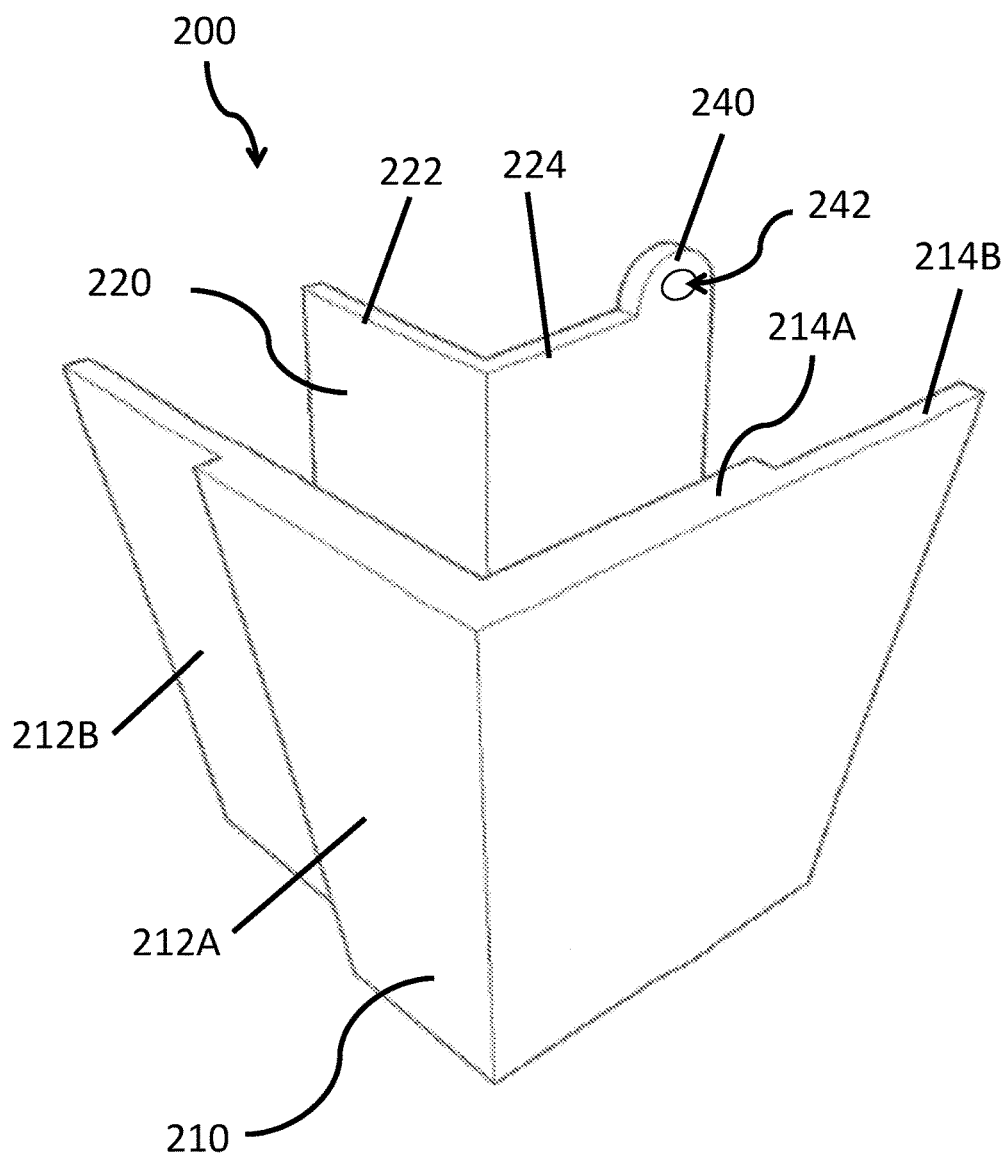
FIG. 4 is perspective view of the exterior of one module of the container of FIG. 3.
Figure 5:
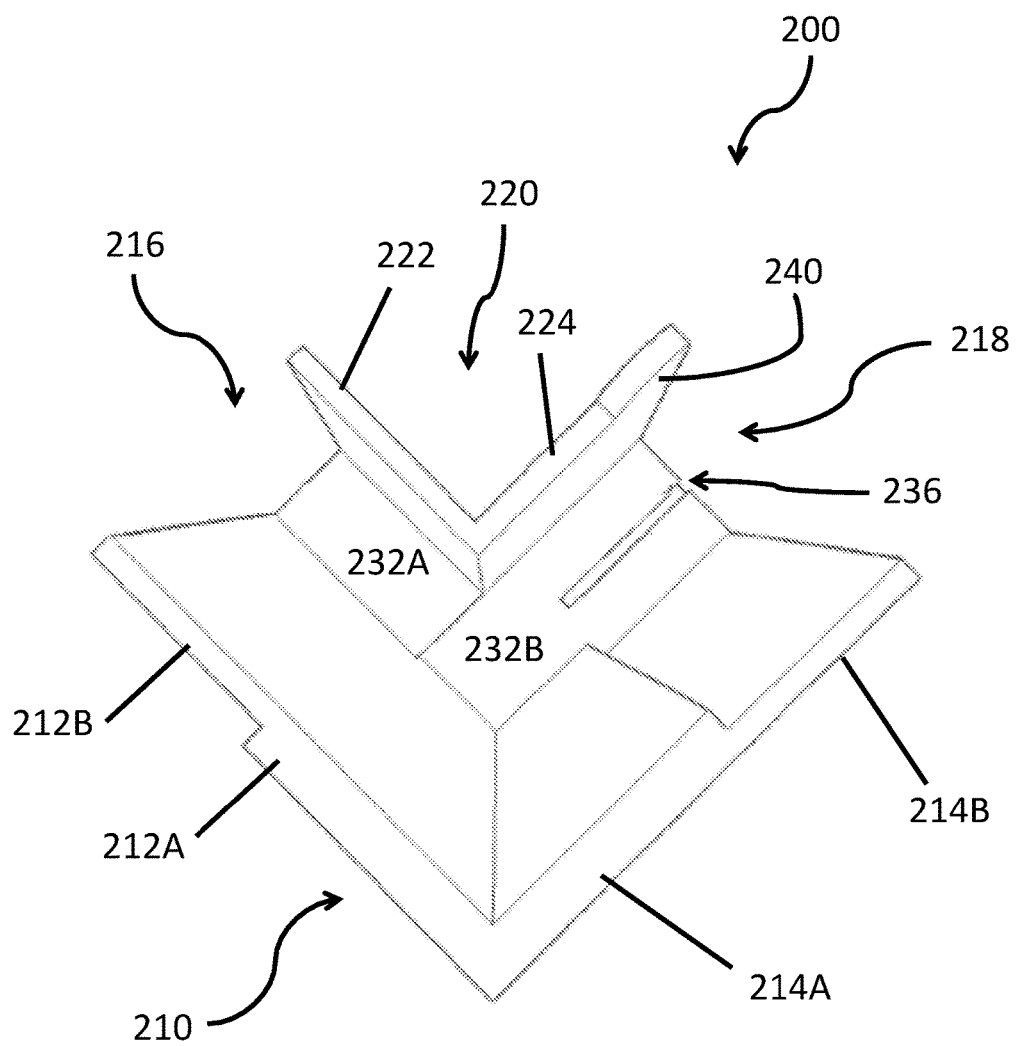
FIG. 5 is top view of the module of FIG. 4.

As illustrated in FIGS. 4 and 5, each module 200 includes an outer wall 210 and an inner wall 220, spaced apart from the outer wall 210. In the illustrated embodiment, both ends 216, 218 are open. The outer wall 210 includes a first outer segment 212A/212B (collectively 212) and a second outer segment 214A/214B (collectively 214) joined at their inner edges at first angle, such as 90°. The first outer segment 212 comprises a thicker section 212A joined with a thicker section 214A of the second outer segment 214. The first outer segment 212 also comprises a thinner section 212B having its inner surface flush with the inner surface of the thicker section 212A. The second outer segment 214 also comprises a thinner section 214B having its outer surface flush with the outer surface of the thicker section 214A. The thinner sections 212B, 214B have approximately the same width.

The inner wall 220 includes a first inner segment 222 parallel to the first outer segment 212 and a second inner segment 224 parallel to the second outer segment 214. The first and second inner segments 222, 224 are joined at their inner edges at the first angle. The outer and inner walls 210, 220 are joined at their bottom edges by bases 232A, 232B (collectively 232). It will be appreciated that the bases 232A, 232B may be formed as separate pieces and joined together or may be formed in a single piece. A slot 236 is formed in the outer edge of the base 232B parallel to the thinner section 214B of the second outer segment 214. An ear 240 extends above the top edge of the second inner segment 224. An opening 242 through the ear 240 provides a convenient way to secure the unit 200 to a post with a nail or screw. It will be appreciated that the ear 240 may instead extend from the top edge of the first inner segment 222.

Figure 6:
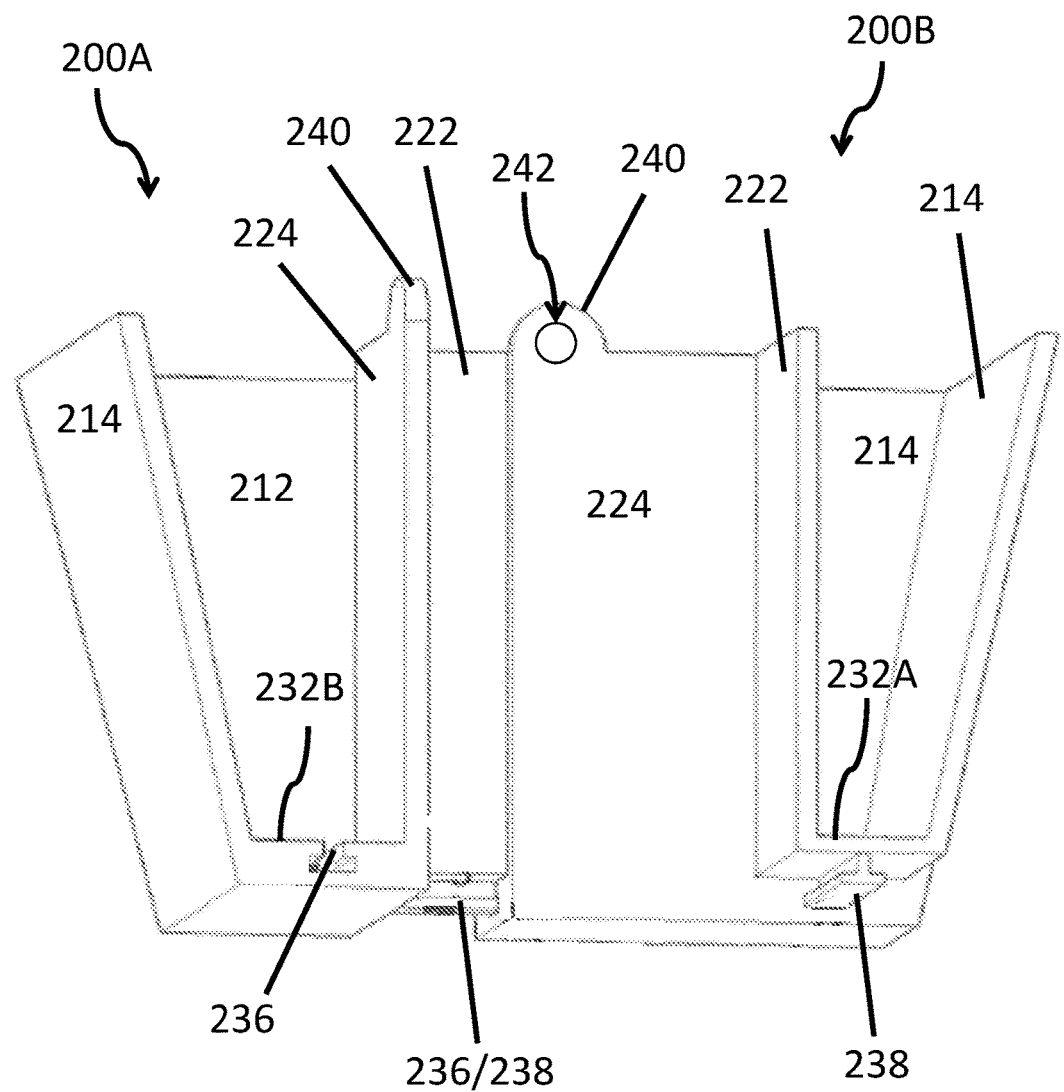
FIG. 6 is an inside view of two interlocked modules.
Figure 7:
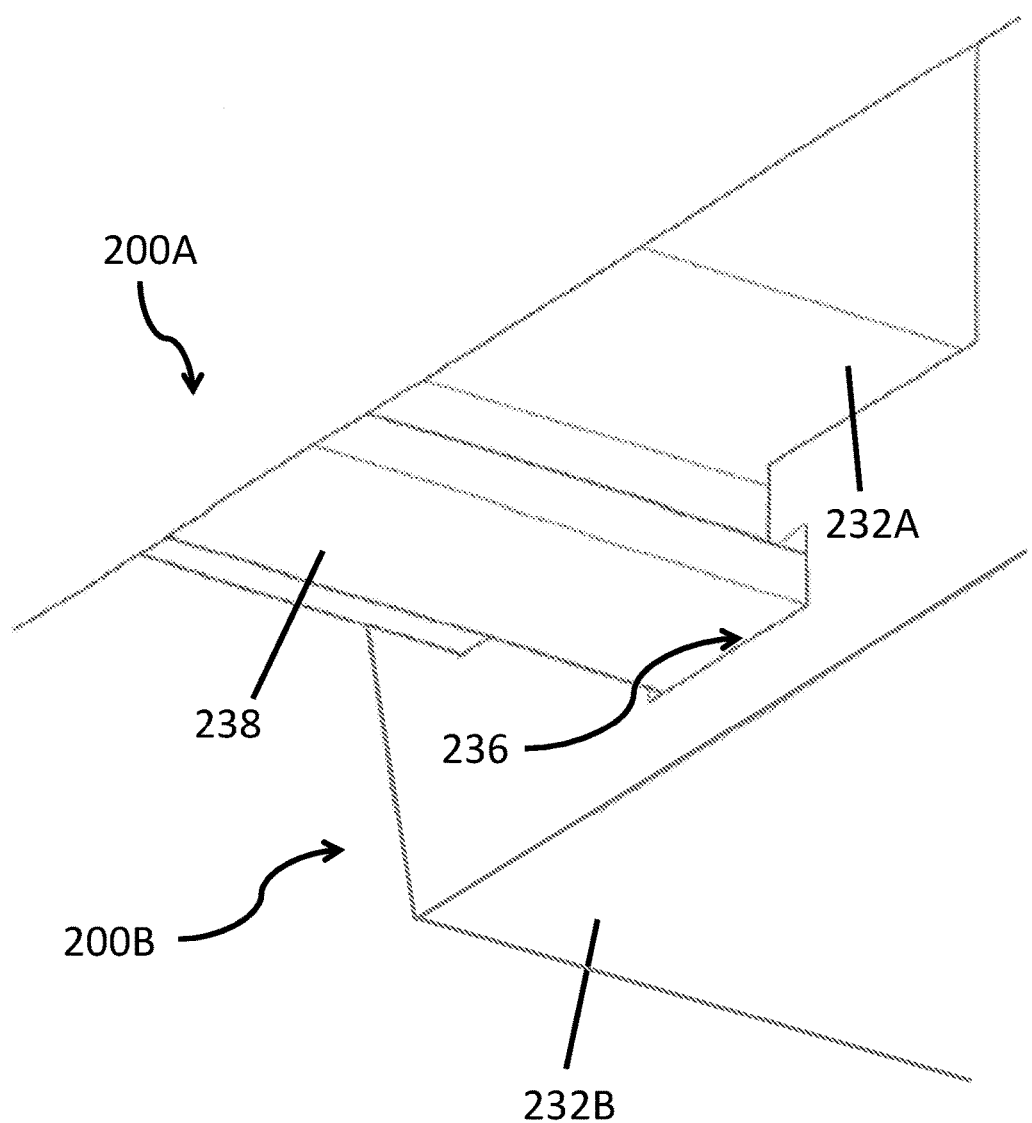
FIG. 7 is a close-up view of a portion of the undersides of two interconnected modules.

FIG. 6 is a view of two interlocked modules 200A, 200B. Extending beneath the base 232A of each module 200 is an elongated upside-down tab 238. In the embodiment illustrated, the slot 236 and the tab 238 both have a T-shape although they may have a different shape in other embodiments. When the container 100 is assembled, the tab 238 of one module 200A slides into the slot 236 in the base 232B of the adjacent module 200B, as illustrated in FIG. 6 and in the close-up view of the undersides of the two modules 200A, 200B shown in FIG. 7. In addition, the inner surface of the thinner section 214B slides across the outer surface of the thinner section 212B. The thinner sections 2126, 214B are approximately one-half the thickness of the thicker sections 212A, 214A. Thus, when two modules 200A, 200B are joined and pushed together, the outer surface of the thicker section 212A of the first outer segment 212 and the inner surface of the thinner section 214B of the second outer segment 214 form a substantially smooth surface. Similarly, the inner surface of the thicker section 214A of the second outer segment 214 and the outer surface of the thinner section 212B of the first outer segment 212 also form a substantially smooth surface.

Figure 8:
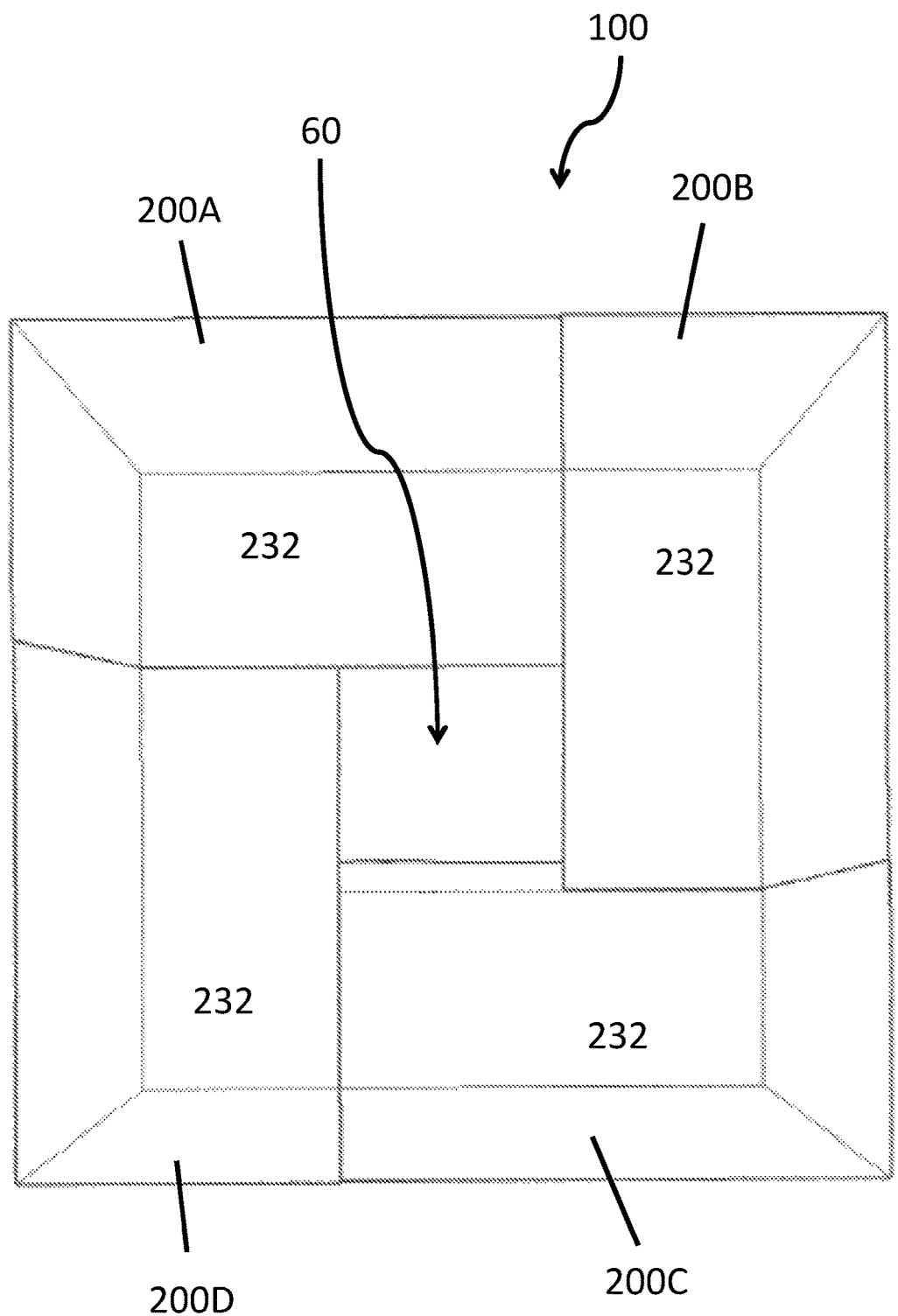
FIG. 8 is bottom view of the assembled container of FIG. 3, with the modules closed.
Figure 9:
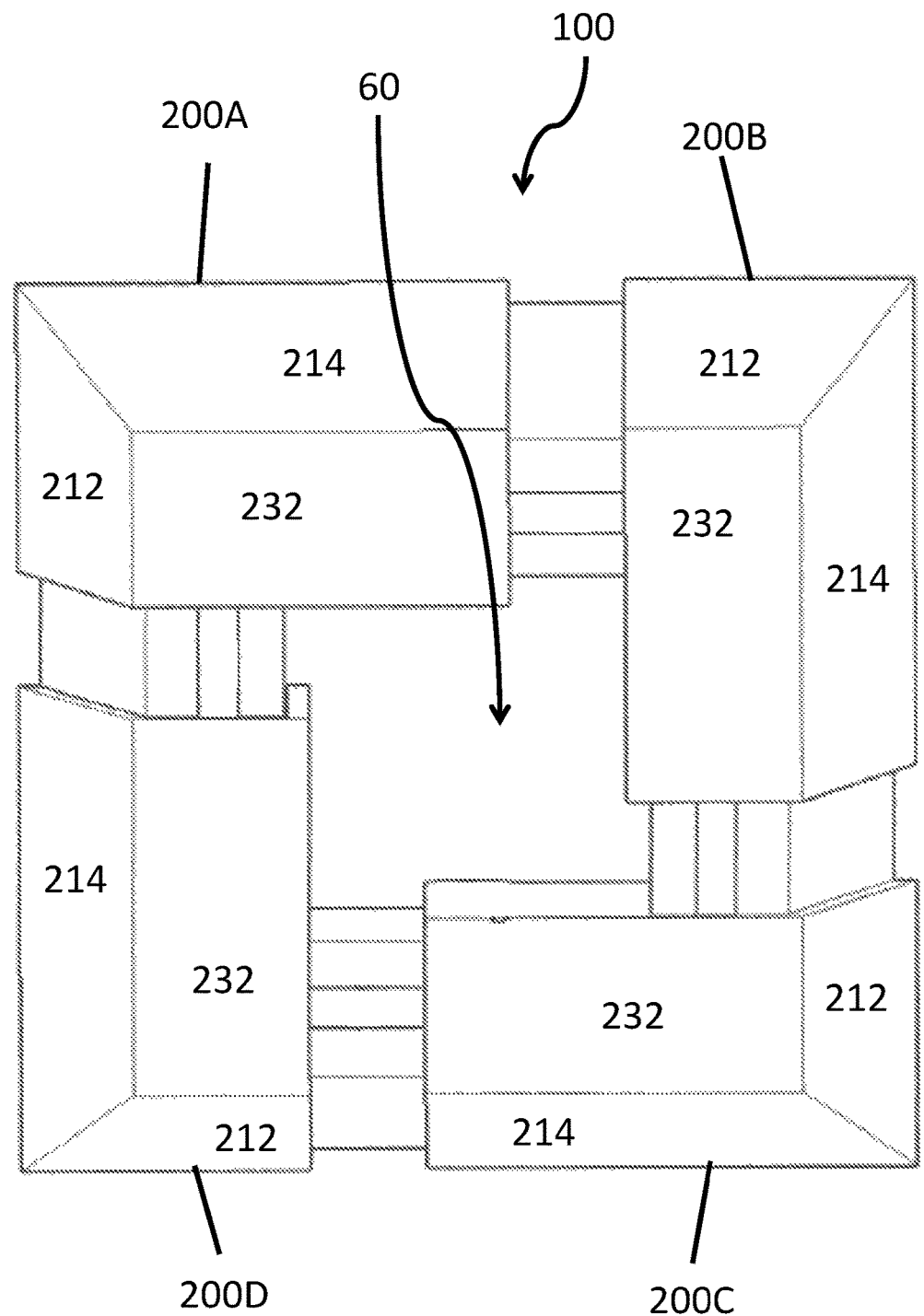
FIG. 9 is bottom view of the assembled container of FIG. 3, with the modules expanded.

FIG. 8 is a view of the underside of the assembled container 100 with the four modules 200A, 200B, 200C, 200D joined together around the inner space 60. In FIG. 8, the tab 238 of each module is slid all the way into the slot 236 of the adjacent module. In FIG. 9, the tab 238 of each module is slid partially into the slot 236 of the adjacent module, providing a larger inner space 60 between the modules. When all four tabs 238 are slid the same distance into the corresponding slots 236, the space 60 has a square cross-section, allowing the container to fit around a square post or other object. When the tabs 238 of two modules 200A, 200C on opposite sides of the space 60 are slid a first distance into the adjacent slots 236 and the tabs 238 of the other two opposing modules 200B, 200D are slid a second distance into the adjacent slots 236, the space 60 has a non-square rectangular cross-section, allowing the resulting container 100 to fit around a rectangular post or other object. Moreover, the present invention is not limited to modules having 90° corners; rather, modules having other geometric shapes may be assembled into containers to wrap-around objects having cross-sections other than square and rectangular.

Figure 10:
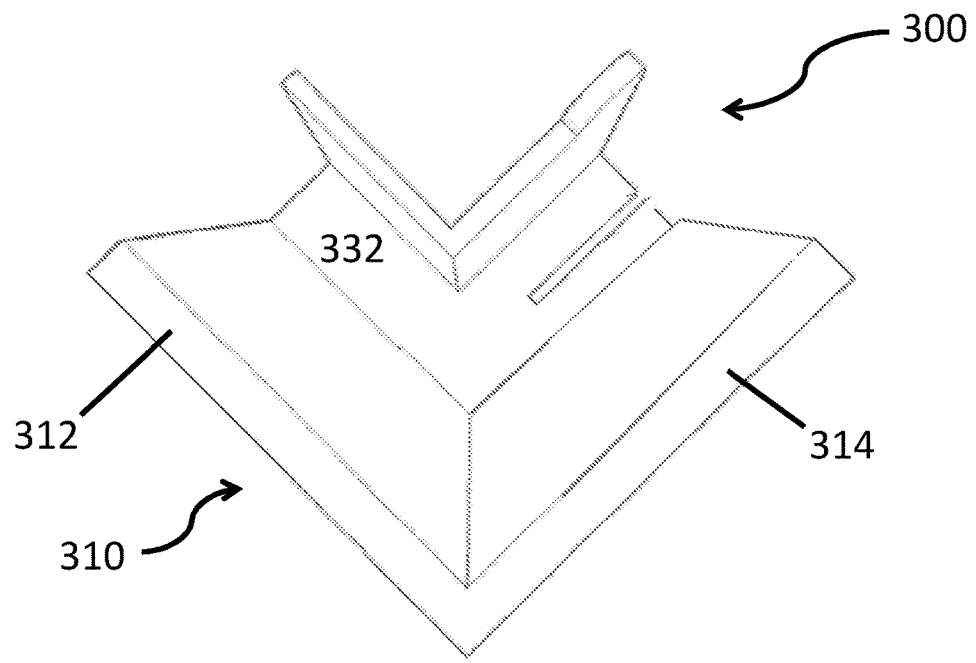
FIG. 10 is a top view of another embodiment of a module, which may be assembled with other such modules to form an adjustable wrap-around container of the present invention

FIG. 10 is a top view of another embodiment of a module 300. In contrast to the module 200, first and second segments 312, 314 of the outer wall 310 of the module 300 are of a consistent thickness. When two modules 300 are fitted together, the outer surface of one of the segments of one module, for example the first segment 312, slides along the inner surface of the second segment 314 of the other module. FIG. 10 also illustrates the base 332 as being formed as a single piece.

Figure 11:
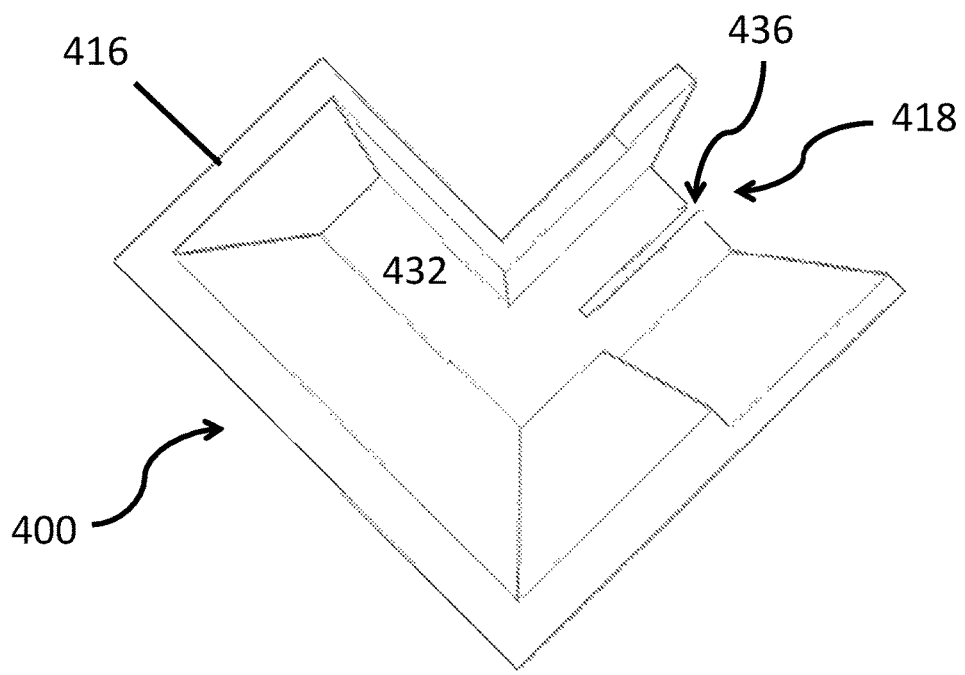
FIG. 11 is a top view of another embodiment of a module with one end closed.
Figure 12:
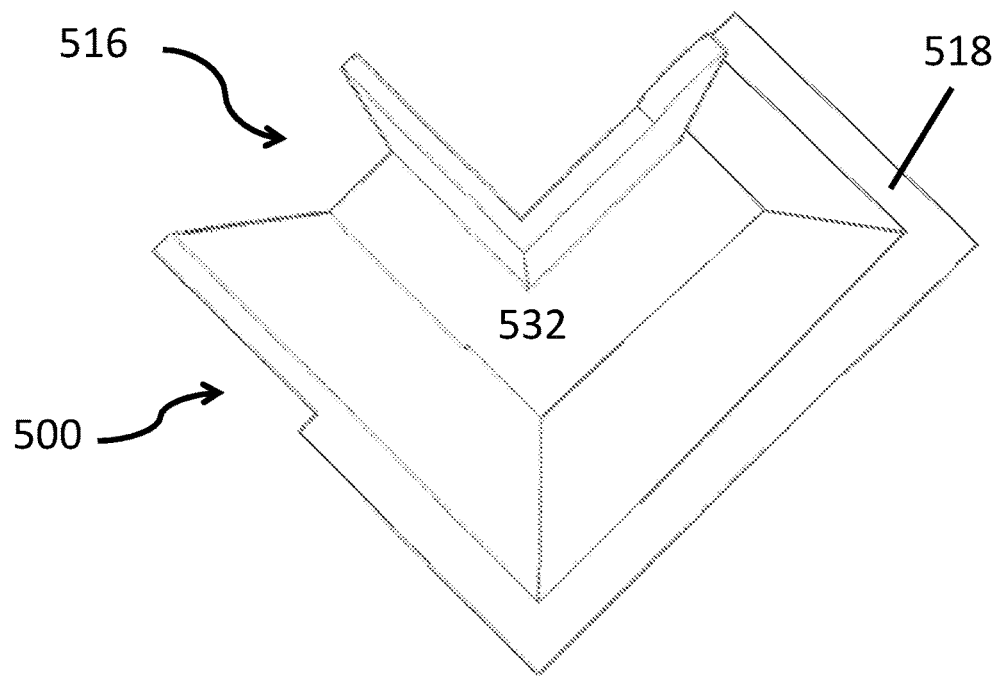
FIG. 12 is a top view of another embodiment of a module with the other end closed.

If a user does not wish for a container to completely surround an object, modules with closed ends may be used. FIG. 11 is a top view of a module 400 closed with an end wall 416. No tab is needed although the slot 436 is formed in the base 432 at the open end 418 to receive the tab from the adjacent module. FIG. 12 is a top view of a module 500 with an end wall 518 at the other end. No slot is needed in the base 532 at the closed end 518 although the tab (not shown) is secured to the underside of the base 532 under the open end 516 to slide into the slot of the adjacent module. To assemble a container around three sides of a rectangular object, such as a post, a module 400 is connected to one end of a standard module 200 and a module 500 is connected to the other end of a standard module 200, thus forming a container with both outer ends closed and able to retain potting soil, a liquid, or other material.

Figure 13:
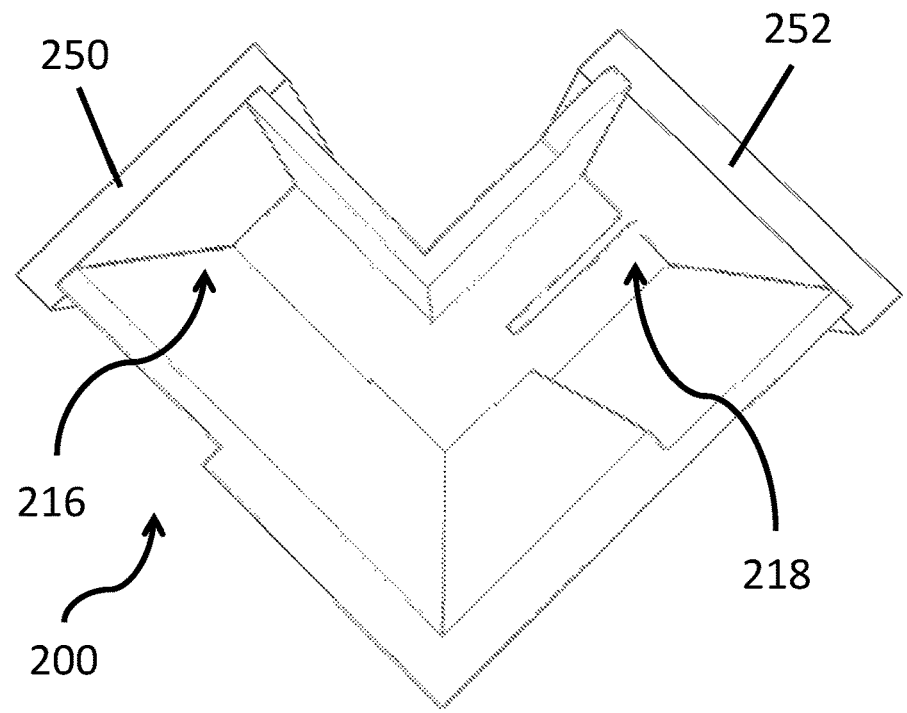
FIG. 13 is a top view of the module of FIG. 4 with caps in place over the open ends of the module.

In still another alternative, a cap may be placed over an open end of the module 200. FIG. 13 illustrates end caps 250, 252 covering both ends 216, 218 of the module 200. A user may also place a cap 250 over one end 250 of a first module and another cap 252 over the other end 218 of a second module. The second module may either be directly connected to the first module or separated from the first module by a third module connected between the first and second modules.

When assembled, a container 100 may hold solids, such as growing soil and plants, or liquids, such as water, and the contents may be displayed around the entire perimeter of the central object, such as a post. The container 100 may be located around the base of the central object or may be hung some distance above the base, such as by using the opening openings 242 in the extensions 240 to nail or screw the container 100 onto the central object.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An adjustable wrap-around container system, comprising:
   a plurality of modules connectable to form a container having an outer perimeter wall and an inner perimeter wall defining an outer volume therebetween, the inner perimeter wall surrounding an inner volume, each module comprising:
   an inner wall, comprising:
      a first inner segment; and
      a second inner segment having an inner edge joined to an inner edge of the first inner segment at a first angle;
   an outer wall spaced apart from the inner wall, comprising:
      a first outer segment parallel to the first inner segment, the first outer segment of the outer wall comprising:
         a thick section having a first thickness; and
         a thin section having a second thickness thinner than the first thickness, an inner surface of the thin section being flush with an inner surface of the thick section;
      a second outer segment parallel to the second inner segment, having an inner edge joined to an inner edge of the first outer segment at the first angle, the second outer segment of the outer wall comprising:

a thick section having the first thickness and joined to the first outer segment; and
a thin section having the second thickness, an outer surface of the thin section being flush with an outer surface of the thick section;
a base connecting the inner wall with the outer wall at their bottom edges, the base comprising:
a first base section between the first inner segment and the first outer segment;
a second base section between the second inner segment and the second outer segment, the second base section having a slot formed in an outer edge parallel to the first inner and outer segments of the inner and outer walls; and
a tab secured to an underside of the first base section perpendicular to the second inner and outer segments of the inner and outer walls;
whereby, a first module and a second module are connected by sliding the tab of the first module into the slot of the second module; and
whereby, when the first module and the second module are connected, at least a portion of an outer surface of the thin section of the first outer segment of each module is adjacent to at least a portion of an inner surface of the thin section of the second outer segment of each module.

2. The system of claim 1, wherein:
the plurality of modules is four; and
the first angle is 90°.

3. The system of claim 1, wherein the second thickness is approximately one-half the first thickness.

4. The system of claim 1, wherein space between outer edges of the inner and outer walls is not closed.

5. The system of claim 1, further comprising a first module having a wall connecting an outer edge of the first inner segment with an outer edge of the first outer segment.

6. The system of claim 5, further comprising a second module having a wall connecting an outer edge of the second inner segment with an outer edge of the second outer segment.

7. The system of claim 1, further comprising an end cap adapted to cover an open end of a first module.

8. The system of claim 1, further comprising an ear extending from a top edge of one of the first inner segment and the second inner segment.

9. The system of claim 1, wherein the slot and the tab both have a T-shape.

10. An adjustable wrap-around container system, comprising:
a first module, comprising:
an inner wall, comprising:
a first inner segment; and
a second inner segment having an inner edge joined to an inner edge of the first inner segment at a first angle;
an outer wall spaced apart from the inner wall, comprising:
a first outer segment parallel to the first inner segment; and
a second outer segment parallel to the second inner segment, having an inner edge joined to an inner edge of the first outer segment at the first angle;
a base connecting the inner wall with the outer wall at their bottom edges, the base comprising:
a first base section between the first inner segment and the first outer segment; and
a second base section between the second inner segment and the second outer segment, the second base section having a slot formed in an outer edge parallel to the first inner and outer segments of the inner and outer walls; and
a wall connecting an outer edge of the first inner segment with an outer edge of the first outer segment;
a second module, comprising:
an inner wall, comprising:
a first inner segment; and
a second inner segment having an inner edge joined to an inner edge of the first inner segment at a first angle;
an outer wall spaced apart from the inner wall, comprising:
a first outer segment parallel to the first inner segment; and
a second outer segment parallel to the second inner segment, having an inner edge joined to an inner edge of the first outer segment at the first angle;
a base connecting the inner wall with the outer wall at their bottom edges, the base comprising:
a first base section between the first inner segment and the first outer segment;
a second base section between the second inner segment and the second outer segment; and
a tab secured to an underside of the first base section perpendicular to the second inner and outer segments of the inner and outer walls; and
a wall connecting an outer edge of the second inner segment with an outer edge of the second outer segment;
wherein the first and second modules are connectable by sliding the tab of the second module into the slot of the first module; and
a third module, comprising:
an inner wall, comprising:
a first inner segment; and
a second inner segment having an inner edge joined to an inner edge of the first inner segment at a first angle;
an outer wall spaced apart from the inner wall, comprising:
a first outer segment parallel to the first inner segment; and
a second outer segment parallel to the second inner segment, having an inner edge joined to an inner edge of the first outer segment at the first angle;
a base connecting the inner wall with the outer wall at their bottom edges, the base comprising:
a first base section between the first inner segment and the first outer segment;
a second base section between the second inner segment and the second outer segment, the second base section having a slot formed in an outer edge parallel to the first inner and outer segments of the inner and outer walls; and
a tab secured to an underside of the first base section perpendicular to the second inner and outer segments of the inner and outer walls;
wherein:
the first and third modules are connectable by sliding the tab of the third module into the slot of the first module; and the second and third modules are connectable by sliding the tab of the second module into the slot of the third module; and wherein for each of the first, second and third modules:
the first outer segment of the outer wall comprises:
a thick section having a first thickness; and
a thin section having a second thickness thinner than the first thickness, an inner surface of the thin section being flush with an inner surface of the thick section; and
the second outer segment of the outer wall comprises;
a thick section having the first thickness and joined to the first outer segment;
a thin section having the second thickness, an outer surface of the thin section being flush with an outer surface of the thick section;
whereby, when the first module and the second module are connected, at least a portion of an outer surface of the thin section of the first outer segment of each module is adjacent to at least a portion of an inner surface of the thin section of the second outer segment of each module.

11. The system of claim 10, wherein the second thickness is approximately one-half the first thickness.

\* \* \* \* \*